June 9, 1964 M. OLESKOW 3,136,331
CONTROL VALVE FOR WATER SOFTENERS
Filed Jan. 12, 1962 2 Sheets-Sheet 1
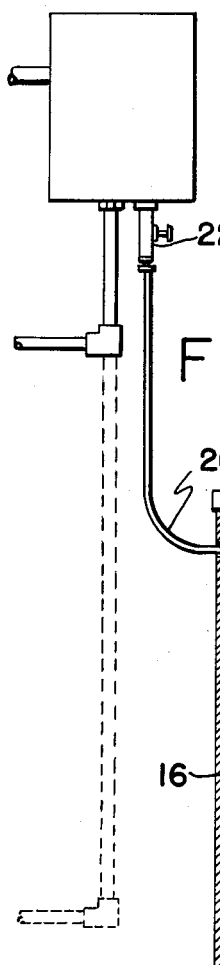
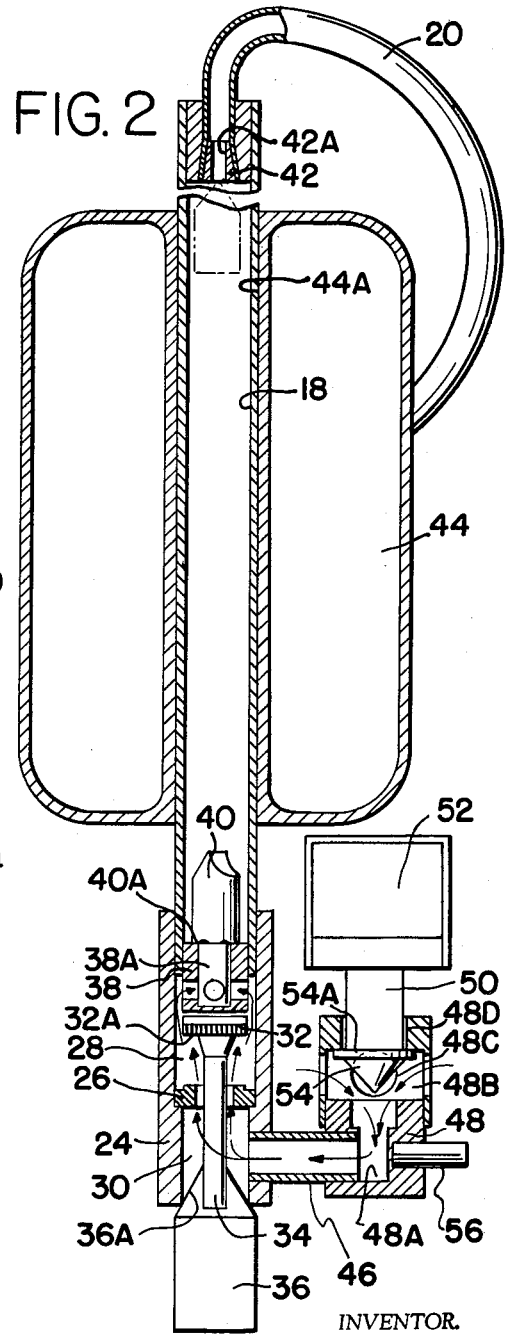
INVENTOR.
MATHEW OLESKOW
BY Mason, Kolehmainen,
Rathburn & Wyss.
ATTORNEYS

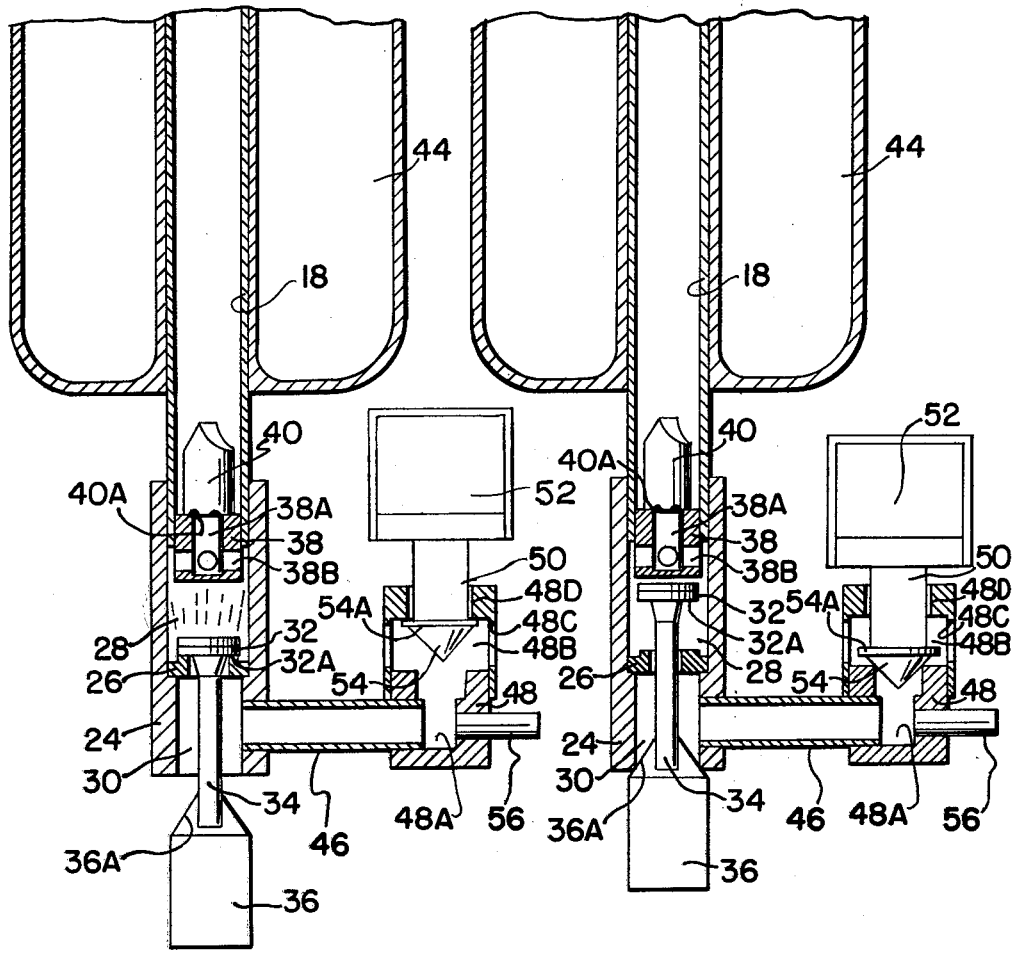

United States Patent Office 3,136,331
Patented June 9, 1964

3,136,331
CONTROL VALVE FOR WATER SOFTENERS
Mathew Oleskow, 5453 Canfield Road, Chicago 31, Ill.
Filed Jan. 12, 1962, Ser. No. 165,798
4 Claims. (Cl. 137—391)

This invention relates to improvements in float valves and more particularly to float valves of the type adaptable for use in connection with water softening systems to control the flow of water into and the flow of brine solution out of a regeneration tank during the regeneration of the ion exchange material in the system.

The present invention is an improvement over the valves illustrated, described, and claimed in my copending applications, Serial No. 67,810, filed November 7, 1960 now Patent No. 3,079,943 and Serial No. 839,203, filed September 10, 1959 now Patent No. 3,049,144.

Accordingly, it is an object of the present invention to provide a new and improved valve apparatus for controlling the flow of regeneration fluid in connection with water softening systems or the like.

Another object of the present invention is to provide a new and improved valve adaptable for use in connection with a water softening system in which the valve apparatus is of simple design and construction and can be easily manufactured at low cost with a minimum of parts requiring close dimensional tolerances or machining.

Another object of the present invention is to provide a new and improved valve apparatus which can be constructed entirely of plastic material and in which a plastic solvent or cement is used to seal the parts together permanently against leaks without requiring threaded connections.

Another object of the present invention is to provide a new and improved valve apparatus which requires no permanent connection to the brine tank and can be lifted out of the tank for servicing without requiring any disconnections.

Another object of the present invention is to provide a new and improved valve apparatus in which the desired upper level of fluid in the regeneration tank can be obtained and readily adjusted by a hand adjustment of the valve apparatus.

Another object of the present invention is to provide a new and improved valve apparatus of the character described above in which premature closing of the valve is prevented during flow of fluid into the regeneration tank and in which additional vacuum is not required to unseat the valve during an outflow of fluid from the tank when the tank has been overfilled.

The foregoing and other objects of the present invention are accomplished by providing a valve apparatus adapted to be removably positioned within a regeneration tank. The valve apparatus comprises a rigid tube with a valve body connected to the lower end thereof. The upper end of the tube is adapted to be connected to the ejector of a water treatment apparatus by means of a flexible plastic tubing to provide a fluid flow path from the valve body to the ejector.

The valve body is provided with a centrally located main valve seat which divides the valve body into an upper and a lower chamber. A main valve disc is provided in the upper chamber to cooperate with the main valve seat and prevents flow between the two chambers when the disc is seated. The upper end of the valve body is provided with a flow deflector plug which prevents the main valve disc from seating against the lower end of the rigid tube and shutting off the flow between the tube and the upper chamber. A flow restrictor is positioned within the rigid tube above the flow deflector plug and restricts the flow into the upper chamber from the tube.

The lower end of the lower chamber provides a seat for cooperation with a valve stem base in order to shut off flow from the lower chamber to the regeneration tank. The valve stem base and the main valve disc are rigidly connected to each other by means of a valve stem which extends upwardly from the valve stem base into the upper chamber. A float is adjustably positioned on the main tube and can be moved relative to the tube by hand to obtain desired shut-off levels for the valve mechanism.

A connector tube communicates with the lower chamber intermediate its upper and lower end and the other end of the connector tube communicates with the regeneration tank through a lower float controlled check valve in order to shut off fluid flow out of the regeneration tank when a desired low level has been reached.

The invention will best be understood by reference to the following description when taken together with the accompanying drawing, in which:

FIG. 1 is an elevational view with portions broken away illustrating a valve apparatus as characterized by the features of the present invention in use in a water softening system with a regeneration tank.

FIG. 2 is a sectional elevational view of the valve apparatus of FIG. 1 in one of its operating positions.

FIG. 3 is a sectional elevational view of the valve apparatus of FIG. 1 in another of its operative positions.

FIG. 4 is a sectional elevational view of the valve apparatus of FIG. 1 in still another of its operative positions.

Referring now to the drawings, and more specifically to FIG. 1, there is illustrated a regeneration tank 10 which is open to the atmosphere and a relatively smaller well 12 mounted within the tank to receive liquid therefrom. The regeneration material is stored in the tank 10 in the portion outside the well 12 and there is a plurality of openings 14 in the wall of the well 12 to provide for a flow of liquid between the tank 10 and the well.

Positioned within the well 12 is a valve mechanism 16 which is provided with a rigid tube 18, the upper end of which is connected to a flexible tube 20 preferably made of polyethylene. The other end of the tube 20 is connected to an ejector 22 of a water softening apparatus.

As is the practice in water softening systems, when it is desired to regenerate the system, a brine solution is drawn under suction from a tank by the ejector in a desired quantity and then the flow is shut off. Fresh water is then forced back into the tank from the ejector until the desired level is obtained and then the flow is shut off and the system is ready for another similar cycle of operation. Thus, it is desirable to provide a valve mechanism which will allow a solution to be drawn out of a tank until the tank reaches a certain low level and flow is then shut off automatically; and then the valve mechanism opens to allow a fresh supply of water to be forced into the tank until a desired high level is reached and again shuts off automatically.

In order to accomplish the desired functions as described above, the rigid tube 18 of the valve mechanism 16 is provided with a valve body 24 at its lower end. The valve body 24 is provided with a generally centrally located annular main valve seat 26 which divides the body 24 into an upper chamber 28 and a lower chamber 30. A main valve disc 32 is positioned within the upper chamber 28 and cooperates with the main valve seat 26 to shut off flow between the two chambers when the disc 32 is seated against the seat 26. The lower side of the disc 32 is provided with a flexible washer 32A to insure a positive seal when the disc 32 is seated.

A valve stem 34 depends from the bottom of the disc 32 and extends through the central opening in the seat 26. The diameter of the stem 34 is smaller than the central opening in the seat 26 to allow fluid to flow around the stem 34 and through the opening in seat 26 when the disc 32 is in the unseated position.

A valve stem base 36 having an upper conical surface 36A is connected to the lower end of the valve stem 34. The upper conical surface 36A serves as a valve member and cooperates with a valve seat formed by the lower end of the valve body 24 to shut off flow between the lower end of the valve body 24 and the well 12 when the valve stem base 36 is seated against the lower end of the valve body 24.

A flow deflector plug 38 is provided in the lower end of the rigid tube 18 and extends into the upper chamber 28. The deflector plug 38 is provided with a central bore 38A, and a plurality of radial bores 38B in communication therewith. Any flow between the rigid tube 18 and the upper chamber 28 is thus directed toward the outside of the chamber 28 and the bottom face of the plug 38 serves as an upper stop for the valve disc 32 and prevents it from seating against the lower end of the rigid tube 18 and shutting off flow between the tube 18 and the upper chambers 28.

A flow restrictor 40 is provided in the rigid tube 18 and it normally rests on the top surface of the deflector plug 38. The bottom surface of the flow restrictor 40 is provided with a plurality of passageways 40A which communicate between the tube 18 and the bore 38A to allow a restricted fluid flow therebetween even when the restrictor 40 is resting on the upper surface of the plug 38. The diameter of the restrictor 40 is less than the inside diameter of the tube 18 to allow the restrictor 40 to move freely in the tube 18 in response to the direction and quantity of flow through the tube 18. The upper end of the restrictor 40 is tapered on two sides to a sharp wedgelike edge running across the full diameter of the restrictor in order to allow a full flow of fluid when the restrictor 40 is drawn up against the bottom of the connector 42 inserted into the upper end of the tube 18, as is shown in FIG. 2. The connector 42 is provided with a small diameter opening 42A against which the pointed end of the restrictor 40 can seat as illustrated in phantom in FIG. 2.

A main float 44 is slidably positioned on the rigid tube 18. The float 44 is provided with a central bore 44A which is slightly smaller than the outside diameter of the tube 18 to provide a slight interference therebetween. The float 44 can be moved up and down on the tube 18 by hand to any desired position and will stay in that position because of the slight interference mentioned before.

The wall of the lower chamber 30 is provided with an opening into which a connector tube 46 is inserted. The other end of the tube 46 communicates with a check housing 48 which is arranged axially parallel with the tube 18. The lower part of the housing 48 is provided with a central bore 48A which at its lower end is in communication with the tube 46. The upper end of the bore 48A communicates with a ported chamber 48B which has a plurality of ports 48C in communication with well 12. The upper end of the check housing 48 is provided with a central aperture 48D which serves as a guide for a sliding float rod 50. A lower float 52 is attached to the upper end of the float rod 50 and a check valve 54 is attached to the lower end of the rod 50. The check valve 54 is provided with a stop disc 54A which prevents the float rod 50 from sliding out of the aperture 48D and the lower surface of the valve 54 is of an inverted conical configuration in order that it may seat within the upper end of bore 48A, thus preventing flow from the well 12 into the bore 48A when the float 52 is in its lowest position. A guide pin 56 is connected to the check housing 48 and serves to help position the valve mechanism 16 within the well 12.

All of the parts of the valve mechanism 16 can be constructed of plastic material and do not have to be dimensioned within close tolerances. The use of plastic material throughout makes a light, corrosion resistant valve mechanism which can be assembled and permanently sealed against leaks with a plastic solvent or cement, thus overcoming many of the difficulties encountered with machined metal valve mechanisms of this type. The use of flexible plastic tubing for connecting the valve mechanism to the water softening system allows ease of service in that the entire mechanism can be easily removed from the regeneration tank without making any disconnections.

In operating the new and improved valve mechanism 16, after connection to the ejector 22 of the softening system, water under pressure flows from the ejector 22 down the flexible tube 20 to the rigid tube 18. The restrictor 40 is resting in its lowest position on top of the deflector plug 38 due to the weight of the restrictor 40 and the force of the incoming water forcing it downwardly. Water flows through the passageways 40A in the bottom of the restrictor 40 and into central bore 38A of the deflector plug 38 and out of the radial bores 38B into the upper chamber 28.

Since there is no liquid in the well 12 at this time to act on the main float 44 buoying it upwardly, the weight of the valve mechanism 16 causes the bottom of the lower chamber 24 to seat on the upper conical surface 36A of the valve stem base 36 which is resting on the bottom of the well 12. In this position the main valve disc 32 is raised above the seat 26 allowing the incoming water to flow from the upper chamber 28 through the central opening in the seat 26 around the valve stem 34 into the lower chamber 30. The water cannot flow out the bottom of the lower chamber 30 since it is closed by the conical surface 36A of the valve stem base 36, but must flow through the tube 46 into the check housing 48.

Since there is no fluid in the well 12 there is no upward buoyant force on the lower float 52 and the conical surface of the valve 54 is seated against the upper end of the bore 48A. The pressure of the incoming water forces the valve 54 upward and water then flows into the port chamber 48B and out through the ports 48C into the well 12. As soon as the water level has reached the level of the lower float 52 it is buoyed upwardly keeping the valve 54 open to the incoming flow.

Water continues to flow into the well 12 until its level reaches the desired level and starts to buoy the main float 44 upwardly. As the main float 44 moves upwardly with the rising water level, the entire valve mechanism 16 is raised and the lower end of the valve body 24 moves upwardly away from the conical surface 36A of the valve stem base 36 which is still resting on the bottom of the well 12. This action allows the incoming water to additionally flow out of the bottom of the lower chamber 30 until the mechanism has raised sufficiently that the main valve 32 and washer 32A is seated on the main valve seat 26, shutting off the flow. Additional water pressure in the upper chamber 28 causes the main valve 32 to seat tighter against the seat 26 and thus a positive automatic shut-off of flow is insured. Since the main float 44 can be adjusted by hand to a desired position along the tube 18, the desired water level at which automatic shut-off occurs can be easily and rapidly adjusted as desired without the use of wrenches or other tools. Only a small amount of movement, in the neighborhood of three-quarters of an inch or so is required to effect the shut-off action.

The entire valve mechanism 16 could now be removed from the well 12 while there is still water pressure on the system without the danger of leakage since the main valve 32 would remain seated. This would be desirable in case it was necessary to change the fluid in the tank 10 or clean the tank without interruption of service to the system or to remove or clean the check housing 48 and its associated parts.

After the tank 10 and well 12 have been filled to the desired level and the flow of water shut off as previously described, the water picks up the salt present to form a brine solution for use in the water softening system. The well 12 is provided to reduce the amount of solid particles of salt or other material which might flow into the valve mechanism and the perforations 14 in the well 12 are provided so that the fresh water can mix freely with the salt or other conditioning material in the tank 10 to form the desired brine solution.

When it is desired to use the brine solution in the softening system, the ejector 22 begins to cause a suction pressure in the flexible tube 20. This suction causes the main valve disc 32 and its connected parts to raise off the seat 26 and allows the brine solution to be drawn through the ports 48C from the well, through the bore 48A into the tube 46, through the lower chamber 30, through the opening in the valve seat 26 around the valve stem 34 into the upper chamber 28. The brine solution entering the upper chamber flows around the valve disc 32 through the ports 38B in the flow deflector plug 38, and upward in the bore 38A. This flow of brine raises the restrictor 40 from its lowest position proportionately to the amount of flow created by the suction. The brine flows around the restrictor 40 up the tube 18 into the flexible tube 20 and through the ejector 22 into the softening system.

The amount of suction necessary to start the flow is the amount necessary to lift the main valve 32 from the seat 26. This amount is always fixed for any given installation and is not effected or increased by an inadvertent overfilling of the brine tank by the addition of salt or water since the distance between the valve seat 26 and the brine level is fixed regardless of how full the tank 10 may be because of the floating action of the entire valve mechanism 16. In prior art valves presently in use, the main float is attached to the main valve 32, which is inverted upside down and the valve body is fixedly secured to the brine tank. In case of overfilling of the tank, higher vacuum is necessary to overcome the full buoyancy of the submerged float holding the valve 32 against the seat thus causing very slow flow of brine or no brine flow if the pressure is low or if the ejector is weak.

Once the brine level has receded enough to allow the valve mechanism 16 to lower until the valve stem base 36 rests on the bottom of the well 12, the flow up through the bottom end of the valve body 24 is cut off and the main valve 32 is held in the open position with suction pressure no longer needed for the purpose of holding the valve 32 open. All the brine then is drawn into the system through the ports 48C until the brine level recedes to a level where the lower float 52 no longer holds the valve 54 off its seat on the upper end of the bore 48A. At this time the outflow of brine is automatically cut off before the brine level recedes to the level of the ports 48C thus preventing any floating debris on the surface of the brine from entering the system. Any further increase in suction will seat the valve 54 tighter against the upper end of the bore 48A and will seat the upper conical surface 36A of the valve stem base 36 tighter against the bottom of the valve body 24 thus insuring a positive automatic shut-off of brine outflow.

The amount of brine solution to be used in a cycle can easily be adjusted by moving the main float 44 up or down on the tube 18 and is not fixed as it is in some valve mechanisms which are fixedly secured within a brine tank. The system is now ready to repeat the cycle as described above and as a new charge of fresh water enters the system it will provide a flushing-out action on the valve mechanism, and if further flushing is needed the entire mechanism 16 can be easily removed from the tank 10 and cleaned.

It can be seen from the foregoing that the valve apparatus of the present invention provides a relatively simple, highly efficient, low cost, reliable, and easily serviceable, valve mechanism adapted for use in a regeneration tank for water softening systems which overcomes many of the difficulties of previous valves of this type.

It will, of course, be understood that various changes may be made in form, details, arrangement and proportions of the parts without detracting from the true spirit and scope of this invention. Therefore, the appended claims are intended to cover any and all such modifications as may fall within the true spirit and scope of this invention.

What is claimed as new and is desired to be secured by Letters Patent of the United States is:

1. Apparatus for controlling the flow of fluid into and out of a regeneration tank for a water softener, said apparatus comprising conduit means in said tank having one end adapted for connection to said softener and the other end disposed within the fluid in said tank, float means secured to said conduit means for raising and lowering said conduit means in response to the fluid level in said tank, first valve means operatively associated with said conduit means for closing said other end when said conduit means is lowered to a predetermined low level in said tank and for opening said other end when said conduit means is raised to another predetermined higher level in said tank, second valve means within said conduit means for normally preventing flow through said conduit means when said conduit means is raised above said predetermined higher level, and float controlled check valve means including means for normally establishing communication between said conduit means and the fluid in said tank for closing said communication in response to selected low level of fluid in said tank.

2. Apparatus for controlling the flow of fluid into and out of a regeneration tank for a water softener, said apparatus comprising a flexible tube adapted to be connected to said water softener, conduit means in said tank in communication with said flexible tube and the lower end of said conduit means being in communication with the fluid in said tank, float means adjustably secured to said conduit means for raising said conduit means in response to a high fluid level in said tank, a first valve member movable toward and away from the lower end of said conduit means, a second valve member positioned within said conduit and connected to and movable with said first valve member, a valve seat within said conduit positioned between said first and second valve members, and float operated check valve means in communication with said conduit between said valve seat and said lower end of said conduit for closing said conduit in response to a low level of fluid in said tank.

3. Apparatus for controlling the fluid flow into and out of a regeneration tank for a water softener, said apparatus comprising a rigid plastic tube disposed within said tank the upper end of which is adapted to be connected to said water softener, a hollow plastic float slidably positioned on said tube, said float having a central bore of slightly smaller diameter than the outer diameter of said tube, a valve body in communication with and secured to the lower end of said tube, said valve body having an opening at its lower end in communication with the fluid in said tank, a flow deflector plug disposed within the lower end of said tube and said valve body, said plug having a central bore in communication with said tube and at least one radial bore in communication with said central bore and said valve body, a flow restrictor disposed within said tube, said restrictor being of generally cylindrical shape and having its upper end provided with a pointed shape and its lower end flat with at least one passageway defined therein communicating with said tube and said central bore, an annular valve seat positioned within said valve body intermediate its ends, a valve member positioned within said valve body above said valve seat and adapted to seat thereagainst when in a lowered position, an axially disposed valve stem downwardly depending from said valve member through the opening defined by said annular valve seat, a valve stem base attached to the lower end of said valve stem and having an upper surface adapted to seat against the opening in the lower end of said valve body when said valve member is in a raised position, a check valve housing arranged in axially parallel relation to said valve body and in communication therewith at a point below said annular seat, said check valve housing defining a valve chamber, the side walls of said chamber having at least one port in communication with the fluid in said tank, the lower surface of said chamber defining a check valve seat and the upper surface of the chamber defining a central aperture, a check valve disposed within said chamber and movable toward and away from said check valve seat, said check valve having an upwardly extending float rod slidably engaged in and extending through said aperture, and a second hollow float attached to the upper end of said float rod.

4. Apparatus for controlling the flow of fluid into and out of a tank, said apparatus comprising conduit means in communication with the fluid in said tank, float means adjustably secured to said conduit means for raising said conduit means in response to the fluid level in said tank, a valve body having one end in communication with said conduit means, a first valve seat being defined by the other end of said valve body, a first valve member movable toward and away from said valve seat in response to lowering and raising respectively of said conduit means, a second valve seat within said valve body intermediate its ends, a second valve member movably positioned within said valve body intermediate said second valve seat and said one end of said valve body and interconnected to said first valve member, and a float controlled check valve in communication with said valve body intermediate said first and second valve seats, said check valve being operable to close in response to a low level of fluid in said tank.

References Cited in the file of this patent
UNITED STATES PATENTS 2,906,285     Rosten et al. _____ Sept. 29, 1959

FOREIGN PATENTS 68,436     France _____ Nov. 12, 1957